(12) United States Patent
Gupta

(10) Patent No.: US 7,218,689 B2
(45) Date of Patent: May 15, 2007

(54) METHOD AND APPARATUS FOR DETERMINING THE LOG-LIKELIHOOD RATIO WITH PRECODING

(75) Inventor: Alok Kumar Gupta, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 766 days.

(21) Appl. No.: 10/305,587

(22) Filed: Nov. 27, 2002

(65) Prior Publication Data

US 2003/0112901 A1 Jun. 19, 2003

Related U.S. Application Data

(60) Provisional application No. 60/334,363, filed on Nov. 29, 2001.

(51) Int. Cl.
*H04L 27/06* (2006.01)
(52) U.S. Cl. ...................................... 375/340; 375/341
(58) Field of Classification Search ................ 375/229, 375/233, 235, 240.07, 340, 341, 230, 232, 375/240.01, 240.02, 316, 240
See application file for complete search history.

(56) References Cited

U.S. PATENT DOCUMENTS

| 5,040,191 | A | * | 8/1991 | Forney et al. ............... 375/263 |
| 5,446,763 | A | * | 8/1995 | Baum et al. ................. 375/340 |
| 6,026,122 | A | * | 2/2000 | Kaku et al. .................. 375/265 |
| 6,145,114 | A | | 11/2000 | Crozier et al. |
| 6,188,717 | B1 | | 2/2001 | Kaiser et al. |
| 6,215,831 | B1 | | 4/2001 | Nowack et al. |
| 6,272,183 | B1 | | 8/2001 | Berens et al. |
| 6,282,168 | B1 | | 8/2001 | Vijayan et al. |
| 6,499,128 | B1 | * | 12/2002 | Gerlach et al. ............. 714/755 |
| 6,944,242 | B2 | * | 9/2005 | Yakhnich et al. ........... 375/341 |
| 2003/0147655 | A1 | * | 8/2003 | Shattil ........................ 398/182 |

\* cited by examiner

*Primary Examiner*—Pankaj Kumar
*Assistant Examiner*—Naheed Ejaz
(74) *Attorney, Agent, or Firm*—Thomas R. Rouse; Sandip (Micky) S. Minhas; Dmitry R. Milikovsky

(57) ABSTRACT

An apparatus and method for recovering data transmitted in a wireless communication system is claimed. A plurality of signal points, the signal point including a plurality of modulation symbols from a plurality of coded bits, is received. A first subset of signal points for which a bit is equal to a first value and a second subset of signal points for which the bit is equal to a second value is determined. The first and second subsets are signal points from an expanded signal constellation. The probability that the bit is equal to the first value or the second value is determined as a function of the received signal point. A soft decision symbol may then be determined, based on the probability that the bit is equal to the first value or the second value. The soft decision symbols may be represented as log likelihood ratios.

38 Claims, 7 Drawing Sheets

COMMUNICATION SYSTEM WITH PRECODER

*COMMUNICATION SYSTEMS WITH TURBO CODE AND PRECODER*

METHOD AND APPARATUS FOR DETERMINING THE LOG-LIKELIHOOD RATIO WITH PRECODING

RELATED APPLICATIONS

This application claims priority from U.S. Provisional Patent Application Ser. No. 60/334,363, entitled, "Turbo Coding with Precoding for Multi-Path Fading Channel," filed Nov. 29, 2001, which is incorporated by reference herein.

BACKGROUND

I. Field

The invention generally relates to wireless communications. More specifically, the invention relates to an apparatus and method for determining the log-likelihood ratio for turbo codes and branch metric for convolutional codes when precoding is used.

II. Background

Wireless communication systems are widely deployed to provide various types of communication such as voice, packet data, and so on. These systems may be based on code division multiple access (CDMA), time division multiple access (TDMA), orthogonal frequency division multiplexing (OFDM) or some other multiple access techniques.

Over a severe multi-path fading wireless channel, data transmission at a high rate with high spectral efficiency is a challenging task. Currently, OFDM is considered an effective modulation technique for such a channel. OFDM has been adopted for several wireless LAN standards. OFDM is also often considered for broadband wireless access (BWA) systems. Though OFDM modulation is indeed very effective in dealing with severe multi-path fading channel, it suffers from several disadvantages.

A disadvantage of OFDM systems is the overhead associated with the guard tones in frequency domain and cyclic prefix in time domain. Inefficiency also results from the data transmission block resolution problem. The minimum block size for transmission is the number of bits per OFDM symbol. This number can be large if the number of carriers is large and the high order modulation alphabet is used. For a burst data transmission system, since the frame length, in general, is not an integral multiple of number of bits per OFDM symbol, bits are wasted in padding. The wastage due to padding can be significant, especially for small frame length.

Another notable disadvantage of OFDM is its greater susceptibility to non-linearity and phase noise. The amplitude of the OFDM modulated signal is gaussian distributed. The high peak-to-average power ratio of an OFDM signal makes it susceptible to nonlinear or clipping distortion, as the signal peaks may occasionally thrust into the saturation region of the power amplifier. The result is bit error rate (BER) degradation and adjacent channel interference. Thus, larger output power back-off is needed to reduce the OFDM signal degradation.

OFDM used with good channel codes alleviates some of the problems described above. Channel coding in conjunction with a channel interleaver also eliminates the need for bit loading in OFDM system. However, channel coding does not solve the efficiency problem of OFDM. If the OFDM parameters are not properly selected, then the data transmission efficiency can be appreciably low.

Band limited single carrier system with high order quadrature amplitude modulation (QAM) is widely used scheme for data transmission at high rate with high spectral efficiency for wire line as well as line-of-sight wireless system. It does not suffer from the above-mentioned disadvantages of OFDM. However, the channel equalization for single carrier system in severe multi-path fading channel is a difficult task. Linear equalizer fails to provide satisfactory performance. It has been found through simulation that even if a lower rate channel code is used with a single carrier system, in order to make the total overhead or the spectral efficiency the same for a single carrier and a OFDM system, the single carrier performance with linear equalizer and the ideal equalizer taps is only slightly better than the OFDM.

Use of a decision feedback equalizer (DFE) is well known to be very effective equalization technique for a channel with severe inter-symbol interference (ISI) problems. DFE requires the estimates of past symbols without delay to subtract the ISI contributed by them to the current symbol. If the past symbol estimates are error free, then the ISI contributed by them can be completely subtracted without enhancing noise. This explains the superior performance of ideal DFE, which assumes that error free estimates of the past symbols are available at the receiver. If an incorrect decision is made on the past symbol, then the error propagation can occur. It has been found through simulation that for a severe multi-path channel, the effect of error propagation is so bad that the performance of a DFE is worse than that of a linear equalizer.

A number of methods have been proposed to reduce the affect of the error propagation in the DFE. One method suggests assigning a reliability measure to each equalized soft symbol. The symbol estimate to be fed back to the DFE is based on this reliability. For example, if the equalized symbol has a high reliability, the hard decision is fed back; otherwise the equalized symbol without the hard decision is fed back.

Another method suggests iterating between equalization and channel decoder in a turbo-like manner and has been named "turbo-equalization" in the literature. The main idea is if the channel decoder generates better estimates of the code bits at its output than what it received from the equalizer at its input, this can be fed back to DFE. Consequently during the next iteration of DFE less error propagation will occur within DFE and so on. The first method has almost negligible incremental implementation complexity whereas the second method has substantial increase in complexity and delay. Unfortunately, these methods have been found to be only marginally effective in combating the effect of error propagation.

There is therefore a need in the art for techniques to reduce the affect of the error propagation.

SUMMARY

Aspects of the invention describe an apparatus and method for recovering data transmitted in a wireless communication system that reduces the affect of error propagation. A plurality of modulation symbols from a plurality of coded bits is received. An apparatus and method for recovering data transmitted in a wireless communication system is claimed. A plurality of signal points, the signal point comprising a plurality of modulation symbols from a plurality of coded bits, is received. A first subset of signal points for which a bit is equal to a first value and a second subset of signal points for which the bit is equal to a second value is determined. The first and second subsets are signal points from an expanded signal constellation. In an embodiment, the expanded set constellation is expanded by adding 2Mi to each point in the original constellation, where M is the number of signal points in an underlying one-dimensional signal constellation and i is an integer.

The probability that the bit is equal to the first value or the second value is determined as a function of the received signal point. A soft decision symbol may then be determined, based on the probability that the bit is equal to the first value or the second value. The soft decision symbols may be represented as log likelihood ratios (LLR).

When the channel coding is present, which utilizes the soft decision to compute the bit LLR for turbo codes (or bit branch metric for soft decision Viterbi decoding of convolutional codes), then folding the received constellation (by a modulo function) before computing the bit LLR or branch metric results in a severe performance degradation of the decoder. As such, the LLR determination is done using an expanded signal constellation, thus significantly improving operation of the decoder.

Various aspects and embodiments of the invention are described in further detail below. The invention further provides techniques, methods, receivers, transmitters, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Precoding is a well-known technique to eliminate the effect of error propagation and approach the performance of an ideal decision feedback analyzer (DFE). The idea of precoding is as follows. An ideal DFE requires a perfect estimate of the channel as well as the past symbols. A receiver can obtain almost perfect estimate of the channel but it cannot have perfect estimates of the past symbols. On the other hand, a transmitter has a perfect knowledge of the past symbols. Thus, if the transmitter can obtain the estimate of the channel, then pre-equalization of the channel may occur. For wireless local area network (WLAN) or WAN applications where the access point and user are virtually stationary or slowly moving, the wireless channel may be considered reciprocal. Then both the access point and the user have the estimates of the channel, since the channel is the same in both directions. If the assumption of reciprocity is not valid for some reason, the precoding is still a viable option. The channel estimates can be measured and sent back to the transmitter from the receiver during the initial session prior to the data transmission. Direct pre-equalization suffers from the problem of possible increase in transmitted power as well as possible increase in peak-to-average power. However, this problem is very elegantly solved by the Tomlinson-Harashima (TH) precoding.

Figure 1:
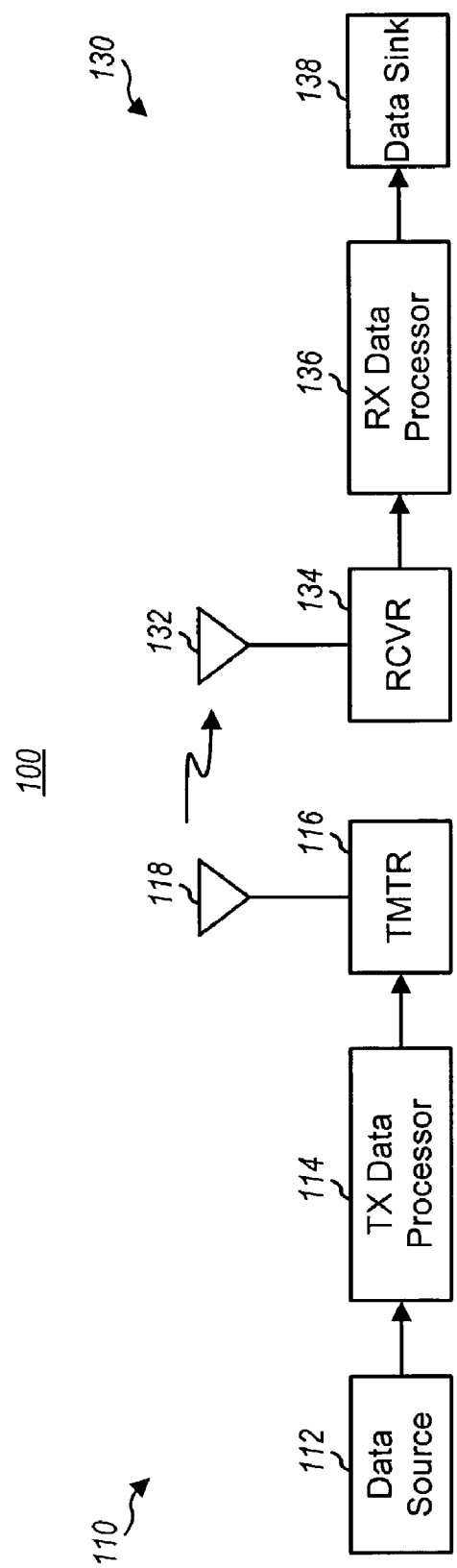
FIG. 1 illustrates a simplified block diagram of a communication system capable of implementing various aspects and embodiments of the invention.

FIG. 1 is a simplified block diagram of a communication system 100 capable of implementing various aspects and embodiments of the invention. In an embodiment, communication system 100 is a CDMA system that conforms to cdma2000, W-CDMA, IS-856, and/or some other CDMA standards. At a transmitter unit 110, data is sent, typically in blocks, from a data source 112 to a transmit (TX) data processor 114 that formats, codes, and processes the data to generate one or more analog signals. The analog signals are then provided to a transmitter (TMTR) 116 that (quadrature) modulates, filters, amplifies, and upconverts the signal(s) to generate a modulated signal. The modulated signal is then transmitted via one or more antennas 118 (only one is shown in FIG. 1) to one or more receiver units.

At a receiver unit 130, the transmitted signal is received by one or more antennas 132 (again, only one is shown) and provided to a receiver (RCVR) 134. Within receiver 134 the received signal(s) are amplified, filtered, downconverted, (quadrature) demodulated, and digitized to generate samples. The samples are then processed and decoded by a receive (RX) data processor 136 to recover the transmitted data. The processing and decoding at receiver unit 130 are performed in a manner complementary to the processing and coding performed at transmitter unit 110. The recovered data is then provided to a data sink 138.

Figure 2A:
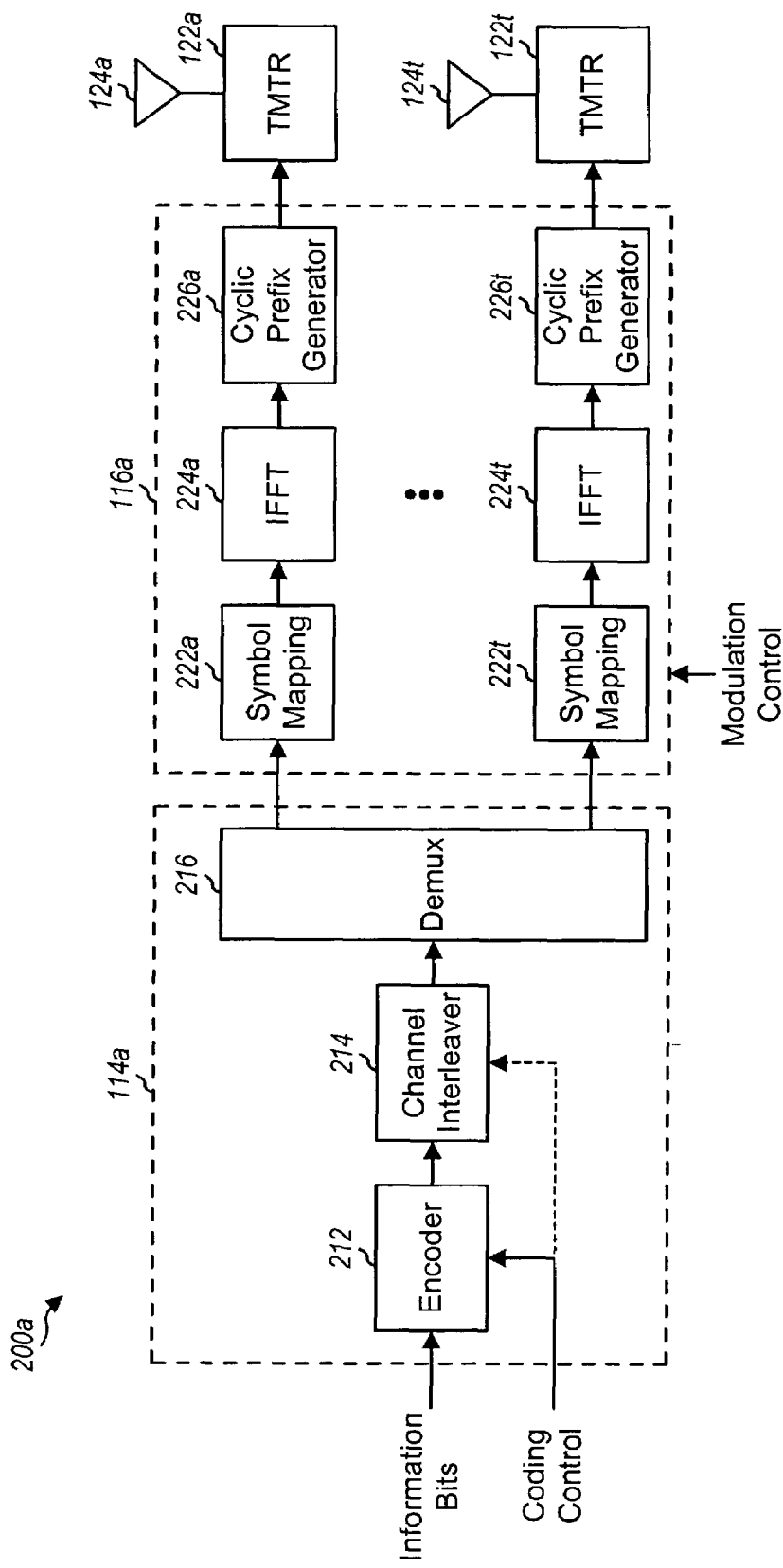
FIGS. 2A and 2B are block diagrams of two transmitter units that code and modulate data with (1) a single coding and modulation scheme and (2) separate coding and modulation schemes on a per-antenna basis, respectively.

FIG. 2A is a block diagram of a transmitter unit 200a, which is an embodiment of the transmitter portion of transmitter system 110 in FIG. 1. In this embodiment, a single coding scheme is used for all $N_T$ transmit antennas and a single modulation scheme is used for all $N_F$ frequency subchannels of all transmit antennas. Transmitter unit 200a includes (1) a TX data processor 114a that receives and codes traffic data in accordance with a specific coding scheme to provide coded data and (2) a modulator 116a that modulates the coded data in accordance with a specific modulation scheme to provide modulated data. TX data processor 114a and modulator 116a are thus one embodiment of TX data processor 114 and modulator 116, respectively, in FIG. 1.

In the specific embodiment shown in FIG. 2A, TX data processor 114a includes an encoder 212, a channel interleaver 214, and a demultiplexer (Demux) 216. Encoder 212 receives and codes the traffic data (i.e., the information bits) in accordance with the selected coding scheme to provide coded bits. The coding increases the reliability of the data transmission. The selected coding scheme may include any combination of cyclic redundancy check (CRC) coding, convolutional coding, Turbo coding, block coding, and so on. Several designs for encoder 212 are described below.

Channel interleaver 214 then interleaves the coded bits based on a particular interleaving scheme and provides interleaved coded bits. The interleaving provides time diversity for the coded bits, permits the data to be transmitted based on an average signal-to-noise-and-interference ratio (SNR) for the frequency and/or spatial subchannels used for the data transmission, combats fading, and further removes correlation between coded bits used to form each modulation symbol. The interleaving may further provide frequency diversity if the coded bits are transmitted over multiple frequency subchannels. The coding and channel interleaving are described in further detail below.

Demultiplexer 216 then demultiplexes the interleaved and coded data into $N_T$ coded data streams for the $N_T$ transmit antennas to be used for the data transmission. The $N_T$ coded data streams are then provided to modulator 116a.

In the specific embodiment shown in FIG. 2A, modulator 116a includes $N_T$ OFDM modulators, with each OFDM modulator assigned to process a respective coded data stream for one transmit antenna. Each OFDM modulator includes a symbol mapping element 222, an inverse fast Fourier transformer (IFFT) 224, and a cyclic prefix generator 226. In this embodiment, all $N_T$ symbol mapping elements 222a through 222t implement the same modulation scheme.

Within each OFDM modulator, symbol mapping element 222 maps the received coded bits to modulation symbols for the (up to) $N_F$ frequency subchannels to be used for data transmission on the transmit antenna associated with the OFDM modulator. The particular modulation scheme to be implemented by symbol mapping element 222 is determined by the modulation control provided by controller. For OFDM, the modulation may be achieved by grouping sets of q coded bits to form non-binary symbols and mapping each non-binary symbol to a specific point in a signal constellation corresponding to the selected modulation scheme (e.g., QPSK, M-PSK, M-QAM, or some other scheme). Each mapped signal point corresponds to an M-ary modulation symbol, where $M=2^q$. Symbol mapping element 222 then provides a vector of (up to) $N_F$ modulation symbols for each transmission symbol period, with the number of modulation symbols in each vector corresponding to the number of frequency subchannels to be used for data transmission for that transmission symbol period.

If conventional non-iterative symbol de-mapping and decoding are performed at the receiver system, then Gray mapping may be preferably used for the symbol mapping since it may provide better performance in terms of bit error rate (BER). With Gray mapping, the neighboring points in the signal constellation (in both the horizontal and vertical directions) differ by only one out of the q bit positions. Gray mapping reduces the number of bit errors for more likely error events, which correspond to a received modulation symbol being mapped to a location near the correct location, in which case only one coded bit would be received in error.

IFFT 224 then converts each modulation symbol vector into its time-domain representation (which is referred to as an OFDM symbol) using the inverse fast Fourier transform. IFFT 224 may be designed to perform the inverse transform on any number of frequency subchannels (e.g., 8, 16, 32, . . . , $N_F$, . . . ). In an embodiment, for each OFDM symbol, cyclic prefix generator 226 repeats a portion of the OFDM symbol to form a corresponding transmission symbol. The cyclic prefix ensures that the transmission symbol retains its orthogonal properties in the presence of multipath delay spread, thereby improving performance against deleterious path effects such as channel dispersion caused by frequency selective fading. The transmission symbols from cyclic prefix generator 226 are then provided to an associated transmitter 122 and processed to generate a modulated signal, which is then transmitted from the associated antenna 124.

Figure 2B:
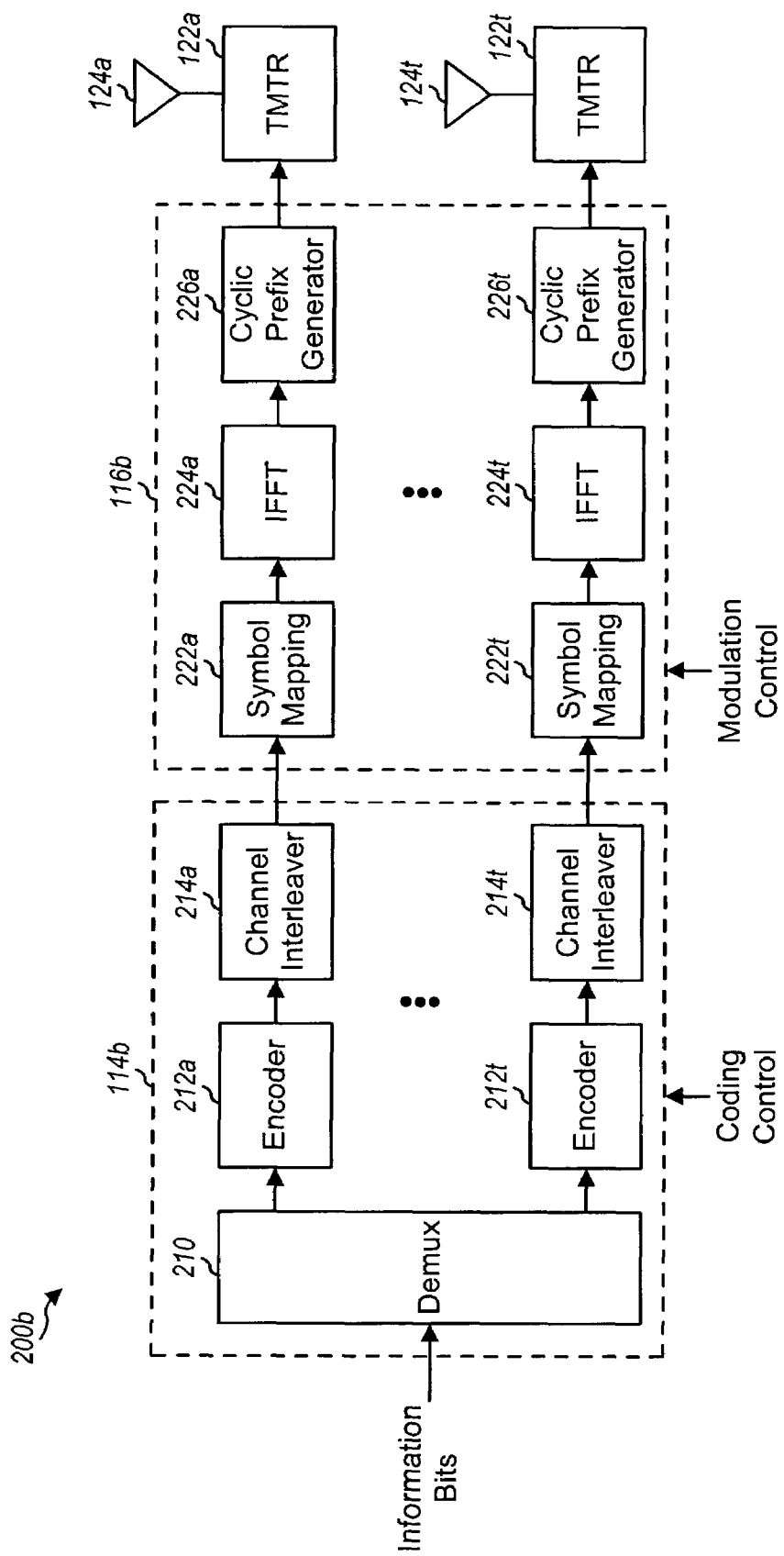

FIG. 2B is a block diagram of a transmitter unit 200b, which is another embodiment of the transmitter portion of transmitter system 110 in FIG. 1. In this embodiment, a particular coding scheme is used for each of the $N_T$ transmit antennas and a particular modulation scheme is used for all $N_F$ frequency subchannels of each transmit antenna (i.e., separate coding and modulation on a per-antenna basis). The specific coding and modulation schemes to be used for each transmit antenna may be selected based on the expected channel conditions (e.g., by the receiver system and sent back to the transmitter system).

Transmitter unit 200b includes (1) a TX data processor 114b that receives and codes traffic data in accordance with separate coding schemes to provide coded data and (2) a modulator 116b that modulates the coded data in accordance with separate modulation schemes to provide modulated data. TX data processor 114b and modulator 116b are another embodiment of TX data processor 114 and modulator 116, respectively, in FIG. 1.

In the specific embodiment shown in FIG. 2B, TX data processor 114b includes a demultiplexer 210, $N_T$ encoders 212a through 212t, and $N_T$ channel interleavers 214a through 214t (i.e., one set of encoder and channel interleaver for each transmit antenna). Demultiplexer 210 demultiplexes the traffic data (i.e., the information bits) into $N_T$ data streams for the $N_T$ transmit antennas to be used for the data transmission. Each data stream is then provided to a respective encoder 212.

Each encoder 212 receives and codes a respective data stream based on the specific coding scheme selected for the corresponding transmit antenna to provide coded bits. The coded bits from each encoder 212 are then provided to a respective channel interleaver 214, which interleaves the coded bits based on a particular interleaving scheme to provide diversity. Channel interleavers 214a through 214t then provide to modulator 116b $N_T$ interleaved and coded data streams for the $N_T$ transmit antennas.

In the specific embodiment shown in FIG. 2B, modulator 116b includes $N_T$ OFDM modulators, with each OFDM modulator including symbol mapping element 222, IFFT 224, and cyclic prefix generator 226. In this embodiment, the $N_T$ symbol mapping elements 222a through 222t may implement different modulation schemes. Within each OFDM modulator, symbol mapping element 222 maps groups of $q_n$ coded bits to form $M_n$-ary modulation symbols, where $M_n$ corresponds to the specific modulation scheme selected for the n-th transmit antenna (as determined by the modulation control provided by controller 130) and $M_n=2^{q_n}$. The subsequent processing by IFFT 224 and cyclic prefix generator 226 is as described above.

Other designs for the transmitter unit may also be implemented and are within the scope of the invention. For example, the coding and modulation may be separately performed for each subset of transmit antennas, each transmission channel, or each group of transmission channels. The implementation of encoders 212, channel interleavers 214, symbol mapping elements 222, IFFTs 224, and cyclic prefix generators 226 is known in the art and not described in detail herein.

The coding and modulation for MIMO systems with and without OFDM are described in further detail in U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001; U.S. patent application Ser. No. 09/854,235, entitled "Method and Apparatus for Processing Data in a Multiple-Input Multiple-Output (MIMO) Communication System Utilizing Channel State Information," filed May 11, 2001; U.S. patent application Ser. No. 09/776,075, entitled "Coding Scheme for a Wireless Communication System," filed Feb. 1, 2001; and U.S. patent application Ser. No. 09/993,087, entitled "Multiple-Access Multiple-Input Multiple-Output (MIMO) Communication System," filed Nov. 6, 2001. These applications are all assigned to the assignee of the present application and incorporated herein by reference. Still other coding and modulation schemes may also be used, and this is within the scope of the invention.

An example OFDM system is described in U.S. patent application Ser. No. 09/532,492, entitled "High Efficiency, High Performance Communication System Employing Multi-Carrier Modulation," filed Mar. 30, 2000, assigned to the assignee of the present invention and incorporated herein by reference. OFDM is also described by John A. C. Bingham in a paper entitled "Multicarrier Modulation for Data Transmission: An Idea Whose Time Has Come," IEEE Communications Magazine, May 1990, which is incorporated herein by reference.

Various types of encoder may be used to code data prior to transmission. For example, the encoder may implement any one of the following (1) a serial concatenated convolutional code (SCCC), (2) a parallel concatenated convolutional code (PCCC), (3) a simple convolutional code, (4) a concatenated code comprised of a block code and a convolutional code, and so on. Concatenated convolutional codes are also referred to as Turbo codes.

The signal processing described above supports transmissions of voice, video, packet data, messaging, and other types of communication in one direction. A bi-directional communication system supports two-way data transmission, and operates in a similar manner.

Figure 3:
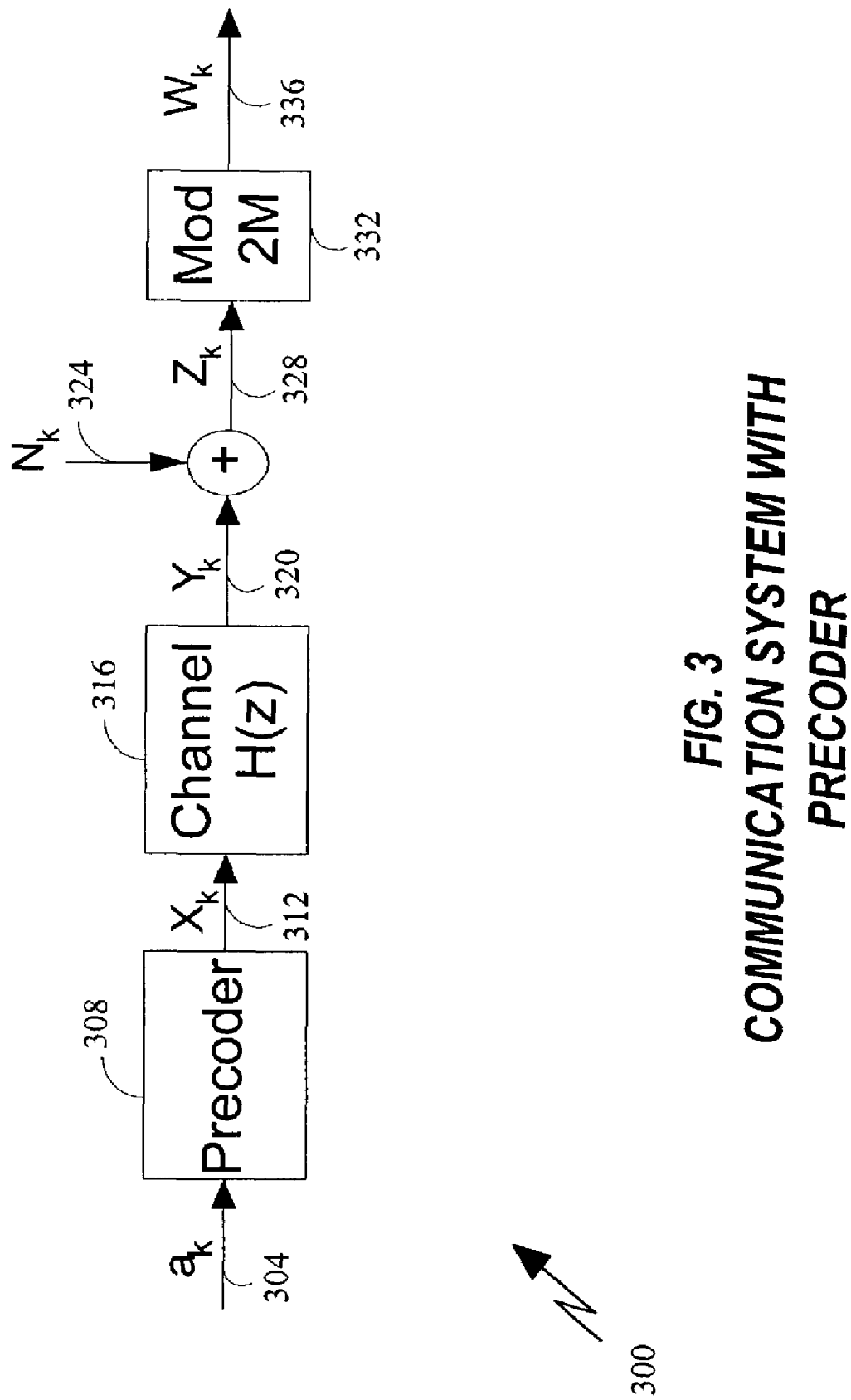
FIG. 3 illustrates a block diagram of a communication system incorporating a precoder.

FIG. 3 illustrates a block diagram 300 of a communication system incorporating a precoder. In FIG. 3, $a_k$ denotes the complex modulation symbol 304 from QAM signal constellation, where k is the time index. Square QAM signal constellation is considered, which may be regarded as the Cartesian product of two PAM constellations having M points, namely (−(M−1), −(M−3), . . . , (M−3), (M−1)). The complex modulation symbol 304 is input into precoder 308. The precoder function 312 is defined as $$X_k = a_k - [X_{k-1}h_{-1} + X_{k-2}h_{-2} + \ldots + X_{k-L}h_{-L}] \bmod 2M \quad (1)$$

which can be rewritten into its real and imaginary parts, $$X_k = a_k + 2M(l_k + jm_k) - [X_{k-1}h_{-1} + X_{k-2}h_{-2} + \ldots + X_{k-L}h_{31\,L}] \quad (2)$$

where $l_k$ and $m_k$ are integers such that the real and imaginary portions of $X_k$ are between +/−M; that is, $-M \leq \mathrm{Re}[X_k]$, $\mathrm{Im}[X_k] \leq M$.

Thus, the precoder function is a function of the current symbol ($a_k$) minus the product of prior precoder outputs ($X_{k-1}$, and so on) and the prior channel impulse response ($h_{-1}$, and so on).

The precoder output 312 is then input into the Channel H(z) 316. Channel H(z) 316 in FIG. 3 denotes the combined transfer function of the transmit filter, multi-path channel, receive filter and feedforward filter of the equalizer, as illustrated by block 450 in FIG. 4 (see FIG. 4 infra.). Assuming that the combined channel impulse response is limited to L+1 symbols, H(z) is represented by $$H(z) = 1 + h_{-1}z^{-1} + h_{-2}z^{-2} + \ldots + h_{-L}z^{-L} \quad (3)$$

The output of the combined transfer function 316 is denoted by $Y_k$ (or 320). Thus, from equation (2) we have $$a_k + 2M(l_k + jm_k) = X_k + X_{k-1}h_{-1} + X_{k-2}h_{-2} + \ldots + X_{k-L}h_{-L} = Y_k \quad (4)$$

$N_k$ denotes the complex added white Guassian noise (AWGN) 324 having a power spectral density of $N_0/2$. When the combined transfer function 320 is mixed with added white guassian noise, the result is represented by Zk (328), then $$Z_k = Y_k + N_k = a_k + 2M(l_k + jm_k) + N_k \quad (5)$$

and $$W_k = Z_k \bmod 2M \quad (6)$$

where the MOD 2M function 332 represents limiting the transmitted signal energy closer to the energy of the unexpected constellation and $W_k$ (336) denotes the decision statistics.

Accordingly, use of precoding results in expansion of the basic signal constellation. This means that if $a_k$ is a signal point in the original QAM constellation then $a_k + 2M(l_k + jm_k)$ is also a valid signal point in the expanded signal constellation, where $l_k$ and $m_k$ are integers. As such, the modulo 2M operation at the receiver folds the expanded signal constellation back to the original constellation.

The performance of the precoder is slightly worse than that of an ideal DFE equalizer for at least the following reasons: the signal after precoding is no longer discrete, but uniformly distributed between [−M, M] resulting in slightly higher transmitted energy for the same minimum distance between two signal points. This is known as precoding loss and it is given by $$\frac{M^2 - 1}{M^2}.$$

This loss becomes negligible for large constellation. Also, the performance of the precoder is slightly worse than that of an ideal DFE equalizer because the precoding results in expansion of basic signal constellation, the average number of nearest neighbors increases, thus slightly degrading the error performance. Nevertheless, precoding is a very powerful, simple and practical means of approaching the performance of an ideal DFE.

Figure 4:
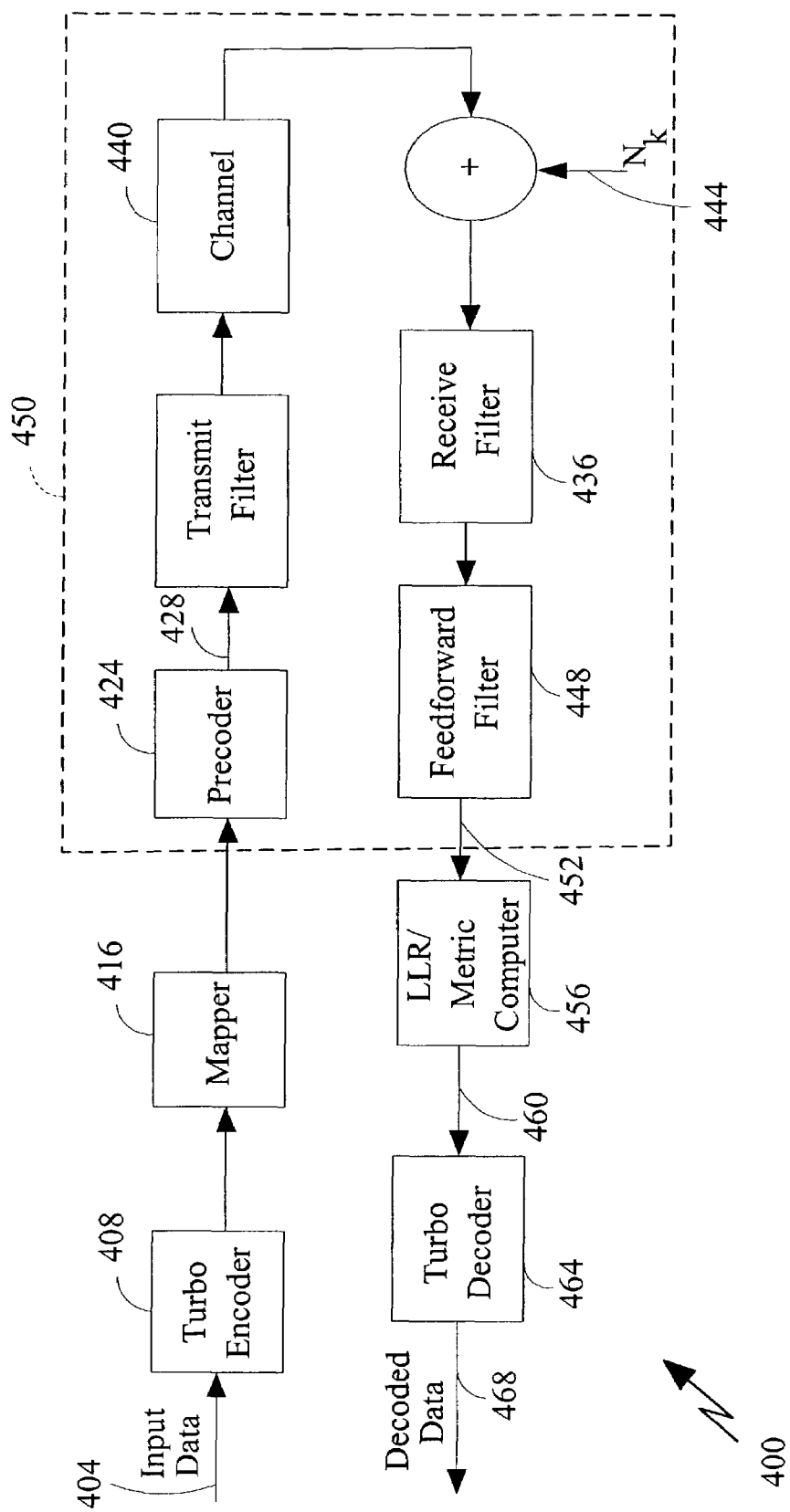
FIG. 4 illustrates a block diagram of a communication system employing turbo coding and precoding.

A block diagram of a communication system 400 employing turbo coding and precoding is illustrated in FIG. 4. A binary data block 404 to be transmitted is encoded with a turbo encoder 408, which generates a sequence of code bits. The turbo code may be parallel or serial concatenated codes. Also, puncturing may be used to generate any code rate. After turbo encoding, the sequence of code bits is fed to a mapper 416, where they are grouped together (2 log $_2$ M) and mapped to a point in $M^2$-QAM signal constellation. In an embodiment, Gray codes are used. The mapper 416 output is a sequence of complex-value modulation symbols. The complex-value symbol sequence is input into a precoder 424. The function of the precoder is discussed in the description with respect to FIG. 3.

The precoder output is also complex value 428. In an embodiment, the complex value signal 428 comprises real and imaginary pans uniformly distributed between −M and +M, where M represents the number of signal point in the constituent pulse amplitude modulation (PAM) constellation. The precoder output 428 is then input to a pulse shaping transmit filter. A receive filter 436 is the complementary shaping filter at the receiver. Both the transmit filter and the receive filter 436 may be square-root Nyquist filters, such that the combined response is Nyquist. The transmit filter and the corresponding receive filter 436

The transmit channel 440 for WLAN may be modeled as independent multi-path Reyleigh fading channel followed by additive white Gaussian noise (AWGN) 444. A feedforward filter 448 is the feed-forward pan of the channel equalizer and maybe fractionally spaced. The receive filter 436 combined with feed-forward filter 448 may be considered to be equivalent to combined channel matched filter and the noise-whitening filter. Given the transmit and receive filters and the impulse response of the channel, the coefficients of the feedforward filter 448 and the precoder 424 can be computed using the Minimum Mean Square Error (MMSE).

$Z_n$ denotes the feedforward filter's output 452, which is fed into the LLR metric computer 456 (n is the time index). LLR metric computer 456 may be a microprocessor, software, microcode running on a microprocessor, embodied in an application specific integrated circuit (ASIC), or in some other form. The output 460 of LLR computer 456 gives a probability that a particular bit is a particular value, and is input into a concatenated convolutional coder 464, such as a turbo coder, thereby producing decoded data 468.

The output of feedforward filter 448 is represented by $$Z_n = A_n + jB_n = a_n + 2M(l_n + jm_n) + N'_n \quad (7)$$

where $a_n$ is the corresponding transmitted QAM symbol and $N'_n$ is the complex AWGN noise sample. $Z_n$ is the received soft decision for the transmitted symbol $a_n$.

LLR computer block 456 computes $2 \log_2 M$ bit LLRs for each received soft QAM symbol. Due to the product symmetry of square QAM constellation and the Gray code mapping, the LLR of a particular code bit is a function of either $A_n$ (the real portion) or $B_n$ (the imaginary portion) and the corresponding one-dimensional PAM signal points. In other words, for the purpose of computing LLRs, the received QAM signal can be considered to be consisting of two independent PAM signals. Hence the LLR for a given code bit $b_k$ (k is the bit index within $\log_2 M$ group of bits or label representing a PAM signal; $0 \leq k \leq \log_2 M$) corresponding to the received signal $A_n$, assuming equally likely modulation symbols, is given by $$LLR(b_k) = \ln\left[\frac{Pr(b_k = 0/A_n)}{Pr(b_k = 1/A_n)}\right] = \ln\left[\frac{\sum_{s \in S_k^0} Pr(s/A_n)}{\sum_{s \in S_k^1} Pr(s/A_n)}\right] \quad (8)$$

$$= \ln\left[\frac{\sum_{s \in S_k^0} Pr(A_n/s)}{\sum_{s \in S_k^1} Pr(A_n/s)}\right] = \ln\left[\frac{\sum_{s \in S_k^0} e^{-\frac{(A_n - s)^2}{2\sigma^2}}}{\sum_{s \in S_k^1} e^{-\frac{(A_n - s)^2}{2\sigma^2}}}\right]$$

where $S_k^0$ and $S_k^1$ represents subsets of M-PAM signal points for which $b_k = 0$ and $b_k = 1$, respectively. As discussed above, due to preceding, the received soft decisions $A_n$ and $B_n$ belong to expanded PAM signal constellation. Thus, the LLR is determined by determining the probability that An was received given that s was transmitted. As illustrated in the last portion of equation (8), the LLR computation may incorporate affects of noise factors $\sigma^2$.

Performing a Mod 2M operation on $A_n$ and $B_n$ folds the received signal point into the basic constellation, which is appropriate if the hard decision is to be performed on $A_n$ and $B_n$. However, when the channel coding is present, which utilizes the soft decision to compute the bit LLR for turbo codes (or bit branch metric for soft decision Viterbi decoding of convolutional codes), then folding the received constellation before computing the bit LLR or branch metric results in a severe performance degradation of the decoder. This is exemplified in FIG. 5.

Figure 5:
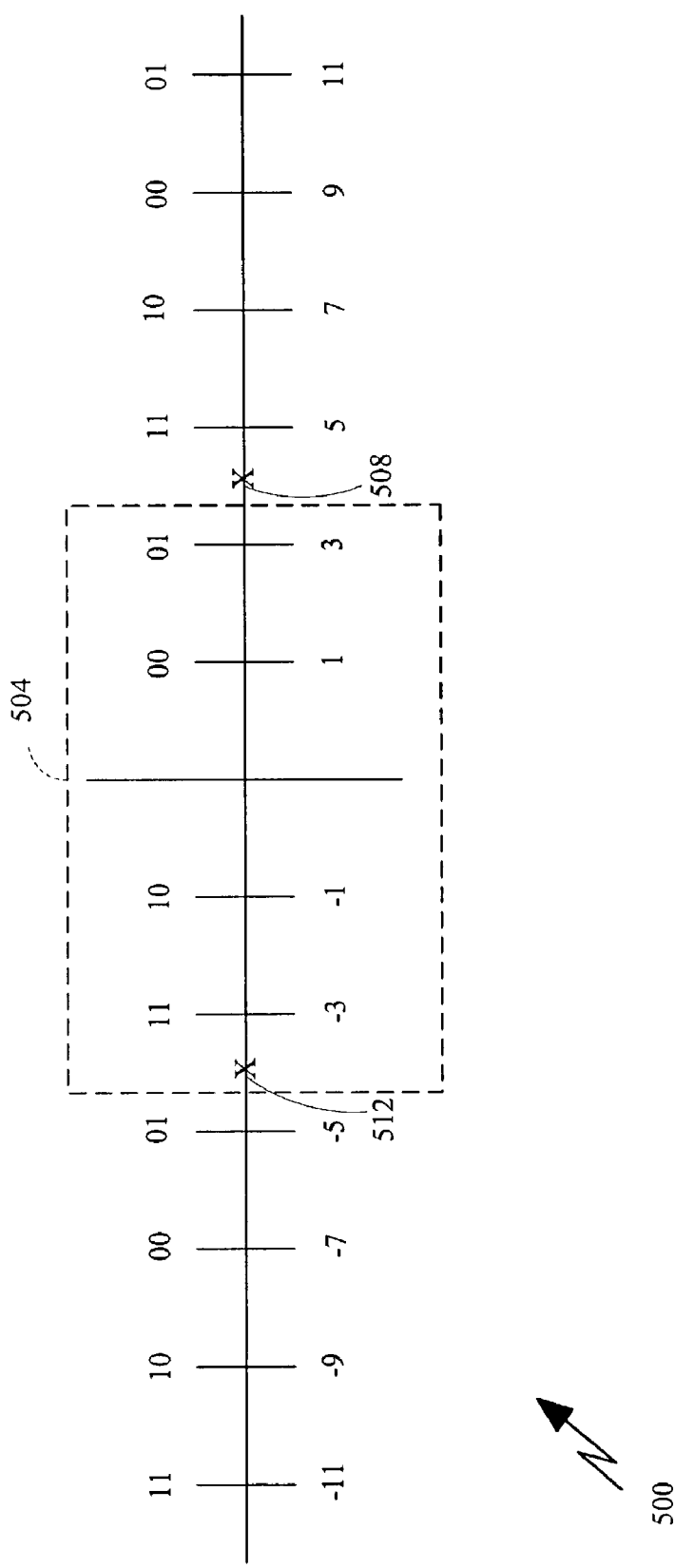
FIG. 5 illustrates an example of a received modulo signal constellation and an expanded signal constellation.

FIG. 5 illustrates a received modulo signal constellation and an expanded signal constellation. Box 504 represents the modulo (unexpanded) signal constellation comprising of points −3, −1, 1, and 3, which correspond to gray codes (for bits $b_0$ and $b_1$), 11, 10, 00 and 01, respectively. If a point 508 is received as illustrated (just outside of "4") and a modulo 2M operation were performed, point 508 translates to point 512 (just inside of −4). In an unexpanded constellation, the probability of point 512 being either a 0 or 1 is evaluated. The probability of bit $b_0$ being "1" is extremely high, since the only near by value for bit $b_0$ is "1" (say approximately a 95% probability). However, if the expanded signal constellation is considered, the probability of point 508 being either a 0 or 1 is evaluated. Since point 508 is slightly closer to "11" than "01", the probability of bit $b_0$ being "1" is much lower (say approximately a 55% probability). Thus, use of an expanded signal constellation before computing the LLR, and not using the modulo 2M operation, yields a significantly more accurate probability determination of the given bit.

Thus, the modification of eliminating the modulo operation and computing the bit LLR on the expanded signal constellation is used for computing the bit LLR or branch metric when a precoder is present. In other words, the set $S_k^0$ and $S_k^1$ is expanded by adding 2Mi to each point in the original set where i is an integer. The LLR is then determined using the expanded set. The range of possible values of i needed to be considered from an ensemble of channel realizations is predetermined. Through simulation, it has been determined that using a large number of channel realizations that i=−2, −1, 0, 1, 2 is generally sufficient; however, it is contemplated than any value of i may be used. Assuming that the above range of i is sufficient, the cardinality of the expanded signal set $S_k^0$ and $S_k^1$ is four times larger than the original set. This increases the complexity of LLR computation significantly. However, this can be minimized if only those points that are within ±M of the received point for LLR or metric computation are considered.

Figure 6:
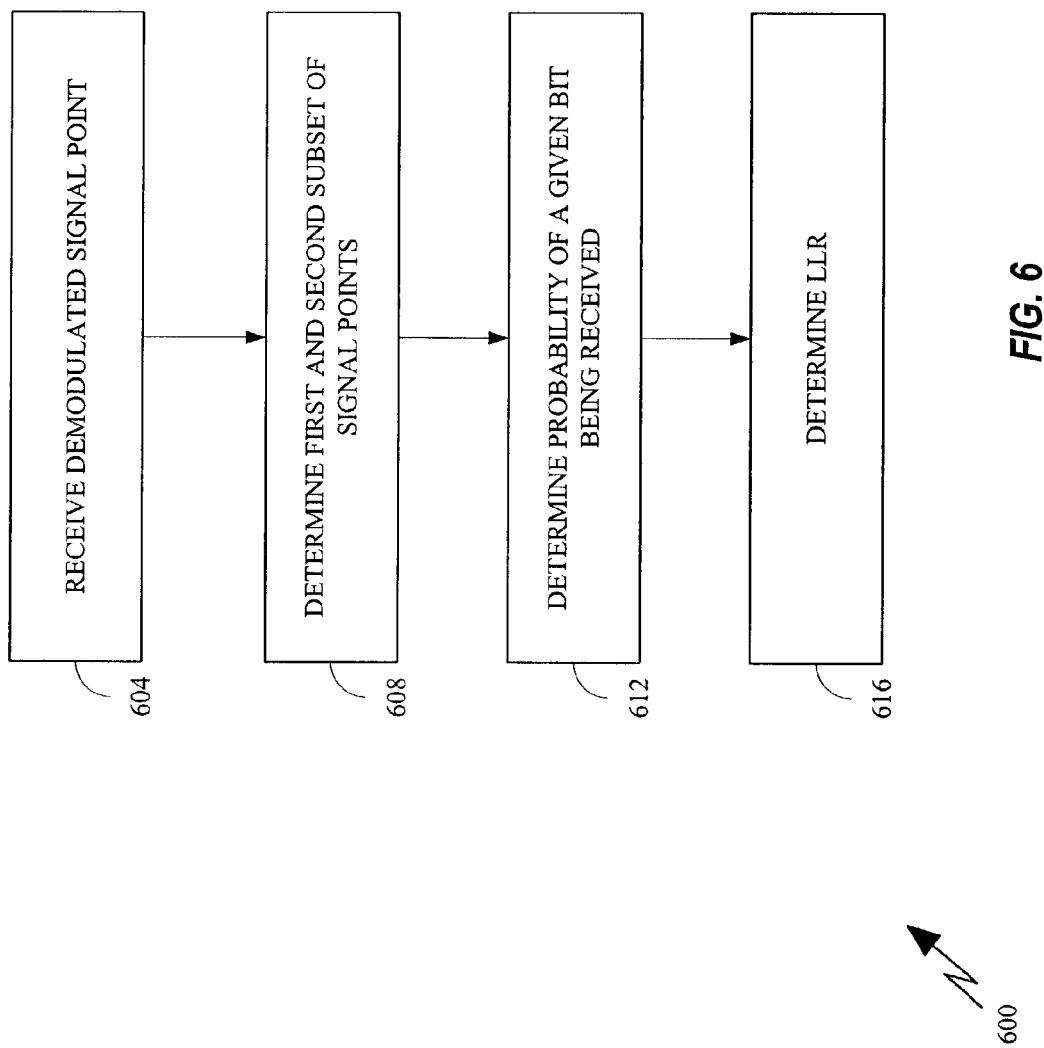
FIG. 6 illustrates a flowchart of the steps undertaken to determine the soft decision symbol.

FIG. 6 illustrates a flowchart 600 of the method by which the LLR is determined. A plurality of demodulated signal points is received 604. The demodulated signal points comprise a plurality of coded bits and noise. A first subset of signal points and a second subset of signal points are determined 608. Next, the probability of a given bit being received, given that a particular soft decision was received, is determined 612. The received soft decision belongs to the expanded signal constellation. Thus, as shown by equation (8), the LLR is determined 616 as the logarithm of the ratio of the summation of the probabilities that the bit received is a "1" or a "0".

Antenna diversity, such as in a multiple input multiple output (MIMO) system, is a powerful scheme to improve the performance of data transmission over a fading channel. The preceding method described above, along with the determination of the LLR using the bit extended constellation, is equally suitable for communication systems employing multiple receive antenna diversity, either combining or selection diversity.

Thus, a novel and improved method and apparatus for determining the LLR in conjunction with a precoder has been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. The processor and an associated storage medium may reside in an application specific integrated circuit (ASIC). The ASIC may reside in a subscriber unit, or in some form of wireless infrastructure. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of recovering data transmitted in a wireless communication system, the method comprising:

receiving a plurality of signal points, the signal point comprising a plurality of modulation symbols from a plurality of coded bits;

determining a first subset of signal points for which a bit is equal to a first value;

determining a second subset of signal points for which the bit is equal to a second value, wherein the first and second subsets are signal points from an expanded signal constellation, wherein the expanded signal constellation is expanded by adding 2Mi to each point in an original constellation, where M is the number of signal points in the original signal constellation and i is an integer:

determining the probability that the bit is equal to the first value or the second value as a function of the received signal point; and recovering data by determining a soft decision symbol based on the probability that the bit is equal to the first value or the second value.

2. The method set forth in claim 1, wherein the soft decision symbols are represented as log likelihood ratios (LLRs).

3. The method set forth in claim 2, wherein the LLR is determined in accordance with the following relationship:

$$LLR(b_k) = \ln\left[\frac{\sum_{s \in S_k^0} Pr(s/A_n)}{\sum_{s \in S_k^1} Pr(s/A_n)}\right]$$

where:
bk is the code bit and k is the bit index within $\log_2 M$ group of bits or label representing a PAM signal where $0 \leq k < \log_2 M$;

An is the received signal corresponding to bk; and and $S_k^0$ represents subsets of M-PAM signal points for which bk=0 and bk=1, respectively.

4. The method set forth in claim 1, wherein the soft decision symbols comprise channel information and extrinsic information.

5. The method set forth in claim 1, wherein the soft decision symbols comprise information for one or more spatial subchannels and one or more frequency subchannels used to transmit the plurality of modulation symbols.

6. The method set forth in claim 1, wherein the wireless communication system is an orthogonal frequency division multiplexing (OFDM).

7. The method set forth in claim 1, wherein the wireless communication system is a multiple-input-multiple-output (MIMO) system.

8. The method set forth in claim 7, wherein the MIMO system implements orthogonal frequency division multiplexing (OFDM).

9. The method set forth in claim 1, wherein the expanded signal constellation is limited to +/−M points from the received point.

10. The method set forth in claim 1, wherein the signal constellation is a pulse amplitude modulation (PAM) constellation.

11. In a wireless communications system, a method of determining soft decision symbols in order to recover data based on received modulation symbols, the method comprising:

determining a first subset of signal points for which a bit is equal to a first value;

determining a second subset of signal points for which the bit is equal to a second value, wherein the first and second subsets are signal points from an expanded signal constellation, wherein the expanded signal constellation is expanded by adding 2Mi to each point in an original constellation, where M is the number of signal points in the original signal constellation and i is an integer;

determining the probability that the bit is equal to the first value or the second value as a function of the received signal point; and determining the soft decision symbol based on the probability that the bit is equal to the first value or the second value to recover data.

12. The method set forth in claim 11, wherein the soft decision symbols are represented as log-likelihood ratios (LLRs).

13. The method set forth in claim 12, wherein the LLR is determined in accordance with the following relationship:

$$LLR(b_k) = \ln\left[\frac{\sum_{s \in S_k^0} Pr(s/A_n)}{\sum_{s \in S_k^1} Pr(s/A_n)}\right]$$

where $b_k$ is the code bit and k is the bit index within $\log_2 M$ group of bits or label representing a PAM signal where $0 \leq k < \log_2 M$;

$A_n$ is the received signal corresponding to $b_k$; and $S_k^0$ $S_k^1$ and represents subsets of M-PAM signal points for which $b_k=0$ and $b_k=1$, respectively.

14. The method set forth in claim 11, wherein the wireless communication system is an orthogonal frequency division multiplexing (OFDM).

15. The method set forth in claim 11, wherein the wireless communication system is a multiple-input-multiple-output (MIMO) system.

16. The method set forth in claim 15, wherein the MIMO system implements orthogonal frequency division multiplexing (OFDM).

17. The method set forth in claim 11, wherein the expanded signal constellation is limited to +/−M points from the received point.

18. The method set forth in claim 11, wherein the signal constellation is a pulse amplitude modulation (PAM) constellation.

19. In a wireless communication system, an apparatus for recovering transmitted data, the apparatus comprising:

means for receiving a plurality of signal points, the signal point comprising a plurality of modulation symbols from a plurality of coded bits;

means for determining a first subset of signal points for which a bit is equal to a first value;

means for determining a second subset of signal points for which the bit is equal to a second value, wherein the first and second subsets are signal points from an expanded signal constellation, wherein the expanded signal constellation is expanded by adding 2Mi to each point in an original constellation, where M is the number of signal points in the original signal constellation and i is an integer;

means for determining the probability that the bit is equal to the first value or the second value as a function of the received signal point; and means for recovering data by determining a soft decision symbol based on the probability that the bit is equal to the first value or the second value.

20. The apparatus set forth in claim 19, wherein the soft decision symbols are represented as log likelihood ratios (LLRs).

21. The apparatus set forth in claim 20, wherein the LLR is determined in accordance with the following relationship:

$$LLR(b_k) = \ln\left[\frac{\sum_{s \in S_k^0} Pr(s/A_n)}{\sum_{s \in S_k^1} Pr(s/A_n)}\right]$$

where $b_k$ is the code bit and k is the bit index within $\log_2 M$ group of bits or label representing a PAM signal where $0 \leq k < \log_2 M$.

$A_n$ is the received signal corresponding to $b_k$; and $S_k^0$ and $S_k^0$ represents subsets of M-PAM signal points for which $b_k=0$ and $b_k=1$, respectively.

22. The apparatus set forth in claim 19, wherein the soft decision symbols comprise channel information and extrinsic information.

23. The apparatus set forth in claim 19, wherein the soft decision symbols comprise information for one or more spatial subchannels and one or more frequency subchannels used to transmit the plurality of modulation symbols.

24. The apparatus set forth in claim 19, wherein the wireless communication system is an orthogonal frequency division multiplexing (OFDM).

25. The apparatus set forth in claim 19, wherein the wireless communication system is a multiple-input-multiple-output (MIMO) system.

26. The apparatus set forth in claim 25, wherein the MIMO system implements orthogonal frequency division multiplexing (OFDM).

27. The apparatus set forth in claim 19, wherein the expanded signal constellation is limited to +/−M points from the received point.

28. The apparatus set forth in claim 19, wherein the signal constellation is a pulse amplitude modulation (PAM) constellation.

29. In a wireless communication system, an apparatus for recovering transmitted data, the apparatus comprising:

a receiver configured to receive a plurality of modulation symbols from a plurality of coded bits;

a processor coupled to the receiver, the processor configured to perform the following method steps:

determining a first subset of signal points for which a bit is equal to a first value;

determining a second subset of signal points for which the bit is equal to a second value, wherein the first and second subsets are signal points from an expanded signal constellation, wherein the expanded signal constellation is expanded by adding 2Mi to each point in an original constellation, where M is the number of signal points in the original signal constellation and i is an integer;

determining the probability that the bit is equal to the first value or the second value as a function of the received signal point; and determining a soft decision symbol based on the probability that the bit is equal to the first value or the second value in order to recover data.

30. The apparatus set forth in claim 29, wherein the soft decision symbols are represented as log likelihood ratios (LLRs).

31. The apparatus set forth in claim 30, wherein the LLR is determined in accordance with the following relationship:

$$LLR(b_k) = \ln\left[\frac{\sum_{s \in S_k^0} Pr(s/A_n)}{\sum_{s \in S_k^1} Pr(s/A_n)}\right]$$

where
 bk is the code bit and k is the bit index within $\log_2 M$ of bits or label representing a PAM signal where $0 \leq k < \log_2 M$;
 An is the received signal corresponding to bk; and
 $S_k^0$ and $S_k^1$ represents subsets of M-PAM signal points for which bk=0 and bk=1, respectively.

32. The apparatus set forth in claim 29, wherein the expanded signal constellation is limited to +/−M points from the received point.

33. The apparatus set forth in claim 29, wherein the signal constellation is a pulse amplitude modulation (PAM) constellation.

34. A computer readable medium storing instructions for controlling a computer system to perform a method, the method comprising:
 determining a first subset of signal points for which a bit is equal to a first value;
 determining a second subset of signal points for which the bit is equal to a second value, wherein the first and second subsets are signal points from an expanded signal constellation, wherein the expanded signal constellation is expanded by adding 2Mi to each point in the original constellation, where M is the number of signal points in the original signal constellation and i is an integer;
 determining the probability that the bit is equal to the first value or the second value as a function of the received signal point; and
 determining a soft decision symbol based on the probability that the bit is equal to the first value or the second value.

35. The medium set forth in claim 34, wherein the soft decision symbols are represented as log likelihood ratios (LLRs).

36. The medium set forth in claim 35, wherein the LLR is determined in accordance with the following relationship:

$$LLR(b_k) = \ln\left[\frac{\sum_{s \in S_k^0} Pr(s/A_n)}{\sum_{s \in S_k^1} Pr(s/A_n)}\right]$$

where
 bk is the code bit and k is the bit index within $\log_2 M$ group of bits or label representing a PAM signal where $0 \leq k < \log_2 M$;
 An is the received signal corresponding to bk; and
 $S_k^0$ and $S_k^1$ represents subsets of M-PAM signal points for which bk=0 and bk=1, respectively.

37. The medium set forth in claim 34, wherein the expanded signal constellation is limited to +/−M points from the received point.

38. The medium set forth in claim 34, wherein the signal constellation is a pulse amplitude modulation (PAM) constellation.

* * * * *